(12) United States Patent
Walls et al.

(10) Patent No.: US 7,397,515 B2
(45) Date of Patent: Jul. 8, 2008

(54) METHOD AND SYSTEM FOR CROSS-CHROMINANCE REMOVAL USING MOTION DETECTION

(75) Inventors: Frederick Walls, Norristown, PA (US); Jason Demas, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 613 days.

(21) Appl. No.: 10/945,769

(22) Filed: Sep. 21, 2004

(65) Prior Publication Data

US 2005/0168650 A1    Aug. 4, 2005

Related U.S. Application Data

(60) Provisional application No. 60/540,405, filed on Jan. 30, 2004.

(51) Int. Cl.
*H04N 5/50* (2006.01)
(52) U.S. Cl. ..................................... 348/624
(58) Field of Classification Search ................ 348/624, 348/668, 663, 441, 448
See application file for complete search history.

(56) References Cited

U.S. PATENT DOCUMENTS

| 4,400,719 | A |   | 8/1983  | Powers |
|-----------|---|---|---------|--------|
| 5,091,783 | A | * | 2/1992  | Miyaguchi .................... 348/24 |
| 5,091,786 | A | * | 2/1992  | Miyaguchi .................. 348/588 |
| 5,093,722 | A | * | 3/1992  | Miyaguchi et al. .......... 348/441 |
| 5,424,784 | A | * | 6/1995  | Raby ........................... 348/668 |
| 5,526,060 | A | * | 6/1996  | Raby ........................... 348/663 |
| 2003/0206587 | A1 | * | 11/2003 | Gomila .................. 375/240.12 |

\* cited by examiner

*Primary Examiner*—Paulos M Natnael
(74) *Attorney, Agent, or Firm*—McAndrews, Held & Malloy, Ltd.

(57) ABSTRACT

In a video system, a method and system for cross-chrominance removal using motion detection are provided. A luma motion detector in a motion adaptive deinterlacer may be used to determine a chroma current motion for a pixel in a video frame. The chroma current motion may be modified, based on a chroma motion mechanism comprising of an edge detection, a back-off, and a motion biasing, when the output pixel is found to be in a static chroma area of the video frame. A static chroma threshold parameter may be used to determine whether the output pixel is in a static chroma area. A cross-chroma reduction determined based on the current chroma motion, may be blended in the motion adaptive deinterlacer with a spatial average approximation of the output pixel to remove the cross-chrominance from the output chroma.

30 Claims, 7 Drawing Sheets

METHOD AND SYSTEM FOR CROSS-CHROMINANCE REMOVAL USING MOTION DETECTION

CROSS-REFERENCE TO RELATED APPLICATIONS/INCORPORATION BY REFERENCE

This patent application makes reference to, claims priority to and claims benefit from U.S. Provisional Patent Application Ser. No. 60/540,405, entitled "Method and System for Cross-Chrominance Removal Using Motion Detection," filed on Jan. 30, 2004.

This application makes reference to:
U.S. application Ser. No. 10/875,422 filed Jun. 24, 2004;
U.S. application Ser. No. 10/945,619 filed Sep. 21, 2004;
U.S. application Ser. No. 10/945,587 filed Sep. 21, 2004;
U.S. application Ser. No. 10/871,758 filed Jun. 17, 2004;
U.S. application Ser. No. 10/945,796 filed Sep. 21, 2004;
U.S. application Ser. No. 10/945,817 filed Sep. 21, 2004;
U.S. application Ser. No. 10/945,729 filed Sep. 21, 2004;
U.S. application Ser. No. 10/945,828 filed Sep. 21, 2004;
U.S. application Ser. No. 10/946,152 filed Sep. 21, 2004;
U.S. application Ser. No. 10/871,649 filed Jun. 17, 2004;
U.S. application Ser. No. 10/946,153 filed Sep. 21, 2004; and
U.S. application Ser. No. 10/945,645 filed Sep. 21, 2004.

The above stated applications are hereby incorporated herein by reference in their entirety.

FIELD OF THE INVENTION

Certain embodiments of the invention relate to processing of video signals. More specifically, certain embodiments of the invention relate to a method and system for cross-chrominance removal using motion detection.

BACKGROUND OF THE INVENTION

In some conventional video processing systems, the transition from standard definition television (SDTV) to high definition television (HDTV) requires that advanced set-top boxes and televisions handle both standard-definition and high-definition video content in a high-quality manner. Cross-chrominance is a phenomenon that occurs when a composite video signal is separated into its luma (Y) and chroma (Cr, Cb) components. Cross-chrominance generally reduces the perceived quality of a HDTV signal. In a digital implementation, a composite video signal at baseband or immediate frequency (IF) is typically digitized using an analog-to-digital (A/D) converter. In an IF sub-sampled implementation, the digitized IF signal is down-converted to baseband using, for example, a mixer and a vestigial side band (VSB) filter. The resulting baseband samples are processed by a video decoder (VDEC), which provides estimates of the originally transmitted luma and chroma components of the video signal. The VDEC may comprise a comb filter, which separates the baseband luma signal from the modulated chroma. Cross-chrominance occurs when the comb filter misinterprets a portion of the luma information in the video signal as chroma information. The misinterpretation may occur for a plurality of reasons. For example, misinterpretation may occur whenever the luma includes frequency components very close to the 3.58 MHz color sub-carrier used for chroma modulation and/or when high-frequency details in the picture cause few spatial correlations, such as in a 2-D case. Misinterpretation may also occur when a comb filter incorrectly discriminates 2-D/3-D, top line/bottom line and notch. In instances where cross-chrominance occurs in an area of the picture that is moving, it may be very difficult to determine the magnitude and phase of a corresponding cross-chrominance vector based on the estimated luma and chroma data received from the VDEC.

In addition to cross-chrominance artifacts, when the comb filter misinterprets chroma information in the video signal as luma information cross-luminance artifacts may occur. This artifact typically manifests itself as hanging dots which occur during a chroma transition. The magnitude of the cross-luminance is typically related to the magnitude of the cross-chrominance. Cross-luminance may also manifest itself as a softening of high-frequency edges that may be incorrectly interpreted as chroma information.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for video signal processing. Aspects of the method may comprise comb filtering a video signal, defining an output pixel in the comb filtered video signal, and removing a cross-chrominance from the output pixel downstream from the comb filtering. The method may comprise determining a luma current motion for the output pixel based on a pixel constellation. A chroma current motion may be determined based on the luma current motion and a current motion offset parameter. When the output pixel is in a present line of a video frame, the chroma current motion for the pixel immediately above or below the output pixel may be assigned to the chroma current motion for the output pixel.

The method may comprise filtering temporal chroma average for a pixel immediately above the output pixel, a pixel immediately below the output pixel, and the output pixel, when the output pixel is in an absent line. When the output pixel is in a present line, the method may comprise filtering a temporal chroma average for the output pixel and for a pixel immediately above or a pixel immediately below the output pixel, depending on system requirements. A static chroma may be compared to a static chroma threshold parameter to determine if the output pixel is in a static chroma area and to determine a back-off for the output pixel. A chroma edge magnitude may be determined and its value may be reduced by the back-off. The chroma current motion may be modified by comparing the chroma edge magnitude to a motion bias threshold parameter. The cross-chrominance may be determined based on the chroma current motion and may be removed from the output pixel temporal chroma average. A spatial chroma average and a maximum cross-chroma parameter may be used to limit the output pixel temporal chroma average after the cross-chrominance has been removed.

Another embodiment of the invention may provide a machine-readable storage, having stored thereon, a computer program having at least one code section executable by a machine, thereby causing the machine to perform the steps as described above for video signal processing.

Aspects of the system may comprise a comb filter that comb filters a video signal and at least one processor that defines an output pixel in the comb filtered video signal and removes a cross-chrominance from the output pixel downstream from the comb filtering. The processor may comprise a motion adaptive deinterlacer. The processor may determine a luma current motion for the output pixel based on a pixel constellation. A chroma current motion may be determined by the processor based on the luma current motion and a current motion offset parameter. When the output pixel is in a present line of a video frame, the processor may assign the chroma current motion for the pixel immediately above or below the output pixel to the chroma current motion for the output pixel.

The processor may filter temporal chroma average for a pixel immediately above the output pixel, a pixel immediately below the output pixel, and the output pixel, when the output pixel is in an absent line. When the output pixel is in a present line, the processor may filter a temporal chroma average for the output pixel and for a pixel immediately above or a pixel immediately below the output pixel, depending on system requirements. A static chroma may be compared by the processor to a static chroma threshold parameter to determine if the output pixel is in a static chroma area and to determine a back-off for the output pixel. The processor may determine a chroma edge magnitude and may reduced its value by the back-off. The chroma current motion may be modified by the processor by comparing the chroma edge magnitude to a motion bias threshold parameter. The processor may determine the cross-chrominance based on the chroma current motion and may remove the cross-chrominance from the output pixel temporal chroma average. A spatial chroma average and a maximum cross-chroma parameter may be used by the processor to limit the output pixel temporal chroma average after the cross-chrominance has been removed.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may comprise a method and system for cross-chrominance removal using motion detection. Aspects of the method may comprise comb filtering a video signal, defining an output pixel in the filtered video signal, and removing a cross-chrominance from the output pixel downstream from the comb filtering, where downstream means outside and after the comb filtering. A chroma current motion may be determined for the output pixel based on a pixel constellation. The chroma current motion may be modified, based on a chroma motion mechanism comprising edge detection, back-off, and a motion biasing, when the output pixel is found to be in a static chroma area of the picture. The cross-chrominance may be determined from the chroma current motion and may be removed from the output pixel temporal chroma average. The output pixel temporal chroma average may be limited after the cross-chrominance has been removed, so that it lies within a range defined by a spatial chroma average of the output pixel and a maximum cross-chroma parameter. The cross-chrominance removal and/or mitigation may be efficiently performed by a motion adaptive deinterlacer.

Figure 1A:
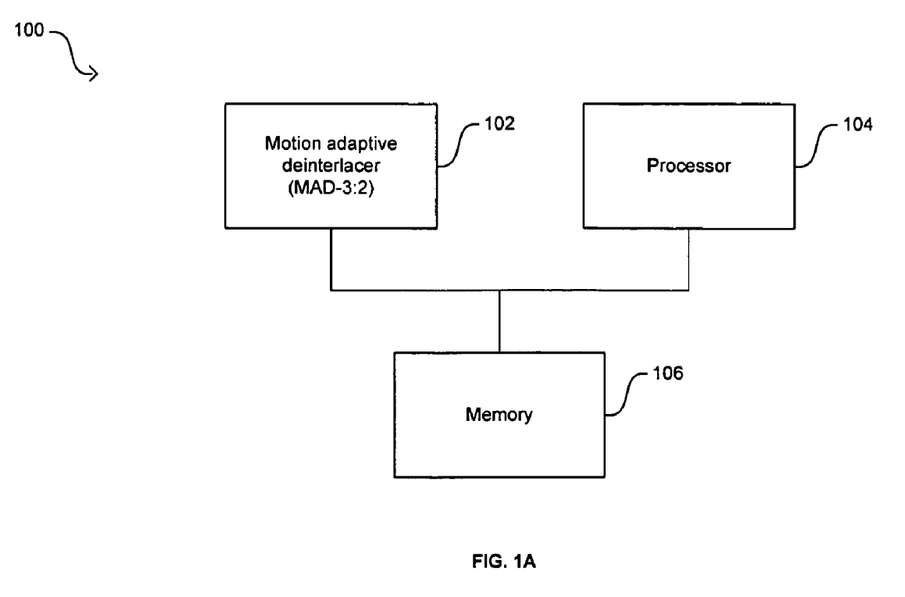
FIG. 1A illustrates a block diagram of an exemplary architecture for positioning of a motion adaptive deinterlacer, in accordance with an embodiment of the invention.

FIG. 1A illustrates a block diagram of an exemplary architecture for positioning of a motion adaptive deinterlacer, in accordance with an embodiment of the invention. Referring to FIG. 1A, the deinterlacer system 100 may comprise a motion adaptive deinterlacer (MAD-3:2) 102, a processor 104, and a memory 106. The MAD-3:2 102 may comprise suitable logic, code, and/or circuitry that may be adapted to deinterlace video fields. The processor 104 may comprise suitable logic, code, and/or circuitry that may be adapted to control the operation of the MAD-3:2 102, to perform the operation of the MAD-3:2 102, and/or to transfer control information and/or data to and from the memory 106. The memory 106 may comprise suitable logic, code, and/or circuitry that may be adapted to store control and data information regarding current video fields, and/or information regarding prior video fields. The memory 106 may be a single memory shared by the processor 104 and the MAD-3:2 102.

Figure 1B:
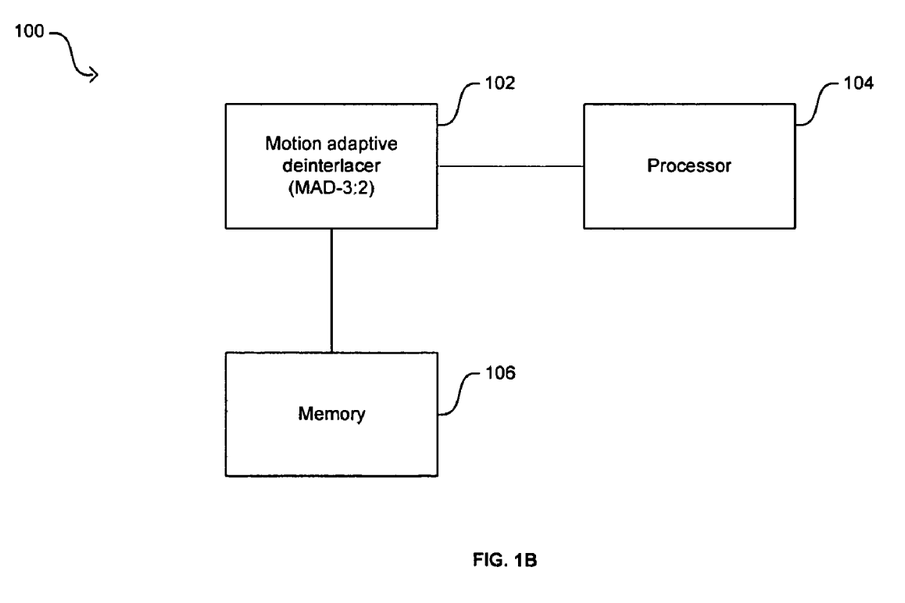
FIG. 1B illustrates a block diagram of an exemplary architecture for positioning of a motion adaptive deinterlacer, in accordance with an embodiment of the invention.

FIG. 1B illustrates a block diagram of an exemplary architecture for positioning of a motion adaptive deinterlacer, in accordance with an embodiment of the invention. Referring to FIG. 1B, the deinterlacer system 100 may also be configured so that the memory 106 may be a dedicated memory to the MAD-3:2 102. In this exemplary embodiment, control, access, and/or transfer of current and/or prior video field information to and from the memory 106 may be performed by the MAD-3:2 102.

The MAD-3:2 102 may be capable of reverse 3:2 pull-down and 3:2 pull-down cadence detection which may be utilized in a video network (VN). The MAD-3:2 102 may be adapted to acquire interlaced video fields from one of a plurality of video sources in the video network and convert the acquired interlaced video fields into progressive frames, at double the display rate, in a visually pleasing manner.

The MAD-3:2 102 may be adapted to accept interlaced video input from a video bus (VB) and output deinterlaced, progressive video to the video bus (BUS) utilized by the video network. The MAD-3:2 102 may accept up to, for example, 720×480i and produce, for example, 720×480p in the case of NTSC. For PAL, the motion adaptive deinterlacer (MAD) may accept, for example, 720×576i and produce, for example, 720×576p. Horizontal resolution may be allowed to change on a field by field basis up to, for example, a width of 720. The MAD-3:2 102 may be adapted to smoothly blend various approximations for the missing pixels to prevent visible contours produced by changing decisions. A plurality of fields of video may be utilized to determine motion. For example, in an embodiment of the invention, five fields of video may be utilized to determine motion. The MAD-3:2 102 may produce stable non-jittery video with reduced risk of visual artifacts due to motion being misinterpreted while also providing improved still frame performance. The MAD-3:2 102 may also provide additional fields per field type of quantized motion information which may be selectable in order to reduce the risk of misinterpretation. For example, up to three (3) additional fields or more, per field type, of quantized motion information may optionally be selected in order to reduce risk of misinterpreted motion even further. This may provide a total historical motion window of up to, for example, 10 fields in a cost effective manner. Integrated cross-chrominance removal functionality may be provided, which may aid in mitigating or eliminating NTSC comb artifacts. A directional compass filtering may also be provided that reduces or eliminates jaggies in moving diagonal edges. The MAD-3:2 102 may provide reverse 3:2 pull-down for improved quality from film based sources. The MAD-3:2 102 may also be adapted to support a variety of sources.

In operation, the MAD-3:2 102 may receive interlaced fields and may convert those deinterlaced fields into progressive frames, at double the display rate. A portion of the information regarding fields that occurred prior to the current field being deinterlaced may be stored locally in the MAD-3:2. A portion of the information regarding fields that occurred after the current field being deinterlaced may also be stored locally in the MAD-3:2. A remaining portion of the information regarding fields that occurred prior to and after the current field may be stored in the memory 106.

The processor 104 may control the operation of the MAD-3:2 102, for example, it may select from a plurality of deinterlacing algorithms that may be provided by the MAD-3:2 102. The processor 104 may modify the MAD-3:2 102 according to the source of video fields. Moreover, the processor 104 may transfer to the MAD-3:2 102, information stored in the memory 106. The processor 104 may also transfer to the memory 106 any field-related information not locally stored in the MAD-3:2 102. The MAD-3:2 102 may then use information from the current field, information from previously occurring fields, and information from fields that occurred after the current field, to determine a motion-adapted value of the output pixel under consideration.

Figure 2:
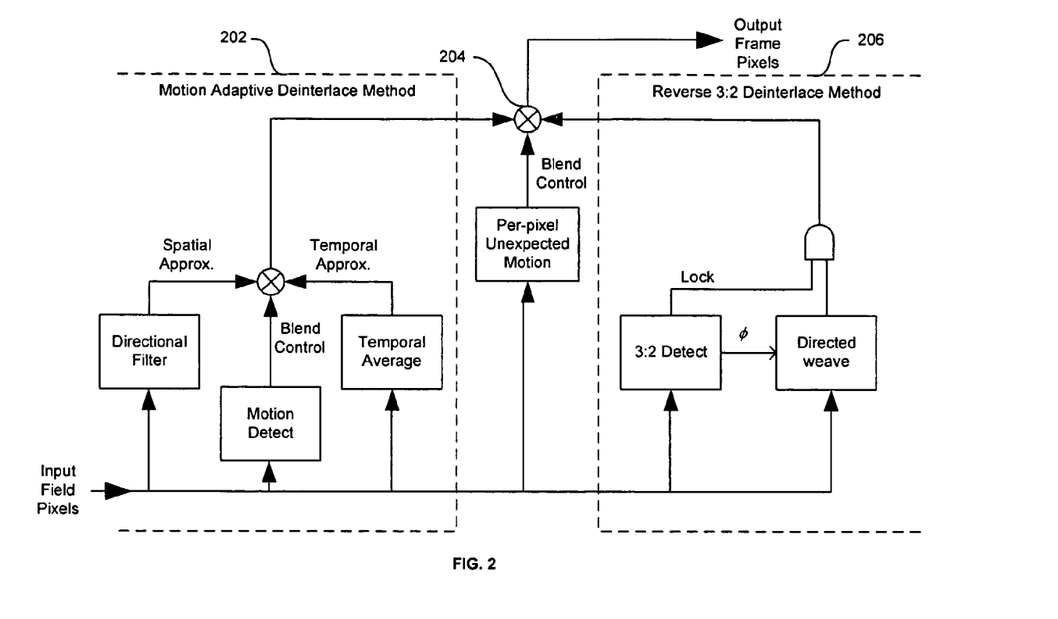
FIG. 2 illustrates a block diagram of an exemplary flow of the algorithm which may be utilized by the MAD-3:2 in FIG. 1, in accordance with an embodiment of the invention.

FIG. 2 illustrates a block diagram of an exemplary flow of the algorithm which may be utilized by the MAD-3:2 in FIG. 1, in accordance with an embodiment of the invention. Referring to FIG. 2, there is shown a data flow corresponding to the algorithm utilized for deinterlacing the luma (Y) component of video. The algorithm may effectively be divided into two halves. For example, diagrammed on the left of FIG. 2 is the motion adaptive deinterlacer (MAD) method 202 of deinterlacing and on the right, there is shown the reverse 3:2 pull-down method 206 of deinterlacing. For every output pixel, the MAD method 202, the reverse 3:2 pulldown method 206, or a blend 204 of the MAD method 202 and the reverse 3:2 pulldown method 206 may be utilized in order to determine a motion-adapted value of the output pixel under consideration.

U.S. Patent Application Ser. No. 60/540,614 filed Jan. 30, 2004 entitled "Improved Correlation Function for Signal Detection, Match Filters, and 3:2 Pulldown Detect," discloses an exemplary reverse 3:2 pulldown method 206 of deinterlacing which may be utilized in connection with the present invention. Accordingly, U.S. Patent Application Ser. No. 60/540,614 filed Jan. 30, 2004 is hereby incorporated herein by reference in its entirety.

Figure 3:
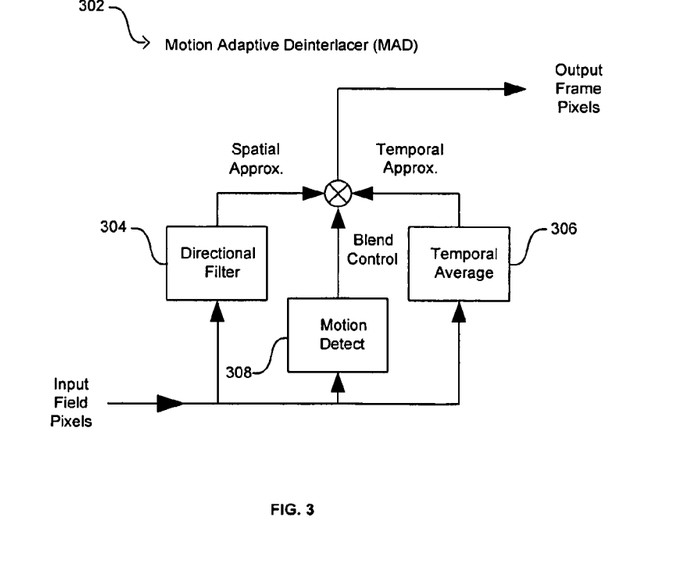
FIG. 3 illustrates an exemplary motion adaptive deinterlacer, in accordance with an embodiment of the present invention.

FIG. 3 illustrates an exemplary motion adaptive deinterlacer, in accordance with an embodiment of the present invention. The motion adaptive deinterlacer (MAD) 302 may comprise a directional filter 304, a temporal average 306, and a blender 308. The MAD 302 may comprise suitable logic, code, and/or circuitry that may be adapted for performing the MAD method 202 of deinterlacing shown in FIG. 2. The processor 104 may be adapted to perform the operation of the MAD 302. The MAD 302 may comprise local memory for storage of data and/or instructions. The directional filter 304 may comprise suitable logic, code, and/or circuitry that may be adapted for spatially approximating the value of the output pixel. The temporal average 306 may comprise suitable logic, code, and/or circuitry that may be adapted for temporal approximation of the value of the output pixel. The blender 308 may comprise suitable logic, code, and/or circuitry that may be adapted to combine the temporal and spatial approximations of the value of the output pixel.

In operation, the MAD 302 may receive input field pixels from an interlaced video field and convert them into output frame fields in a progressive frame, at double the display rate. The horizontal resolution of the input to the MAD 302 may change on a field-by-field basis. The MAD 302 may utilize a motion adaptive algorithm that may smoothly blend various approximations for the output pixels to prevent visible contours, which may be produced by changing decisions. In an embodiment of the present invention, it may be necessary to determine the amount of motion around each output pixel, to use an appropriate approximation for the output pixel. The MAD 302 may utilize the directional filter 304, the temporal average 306, and the blender 308 to obtained a motion-adapted value for the output pixel that is visually pleasing.

Figure 4:
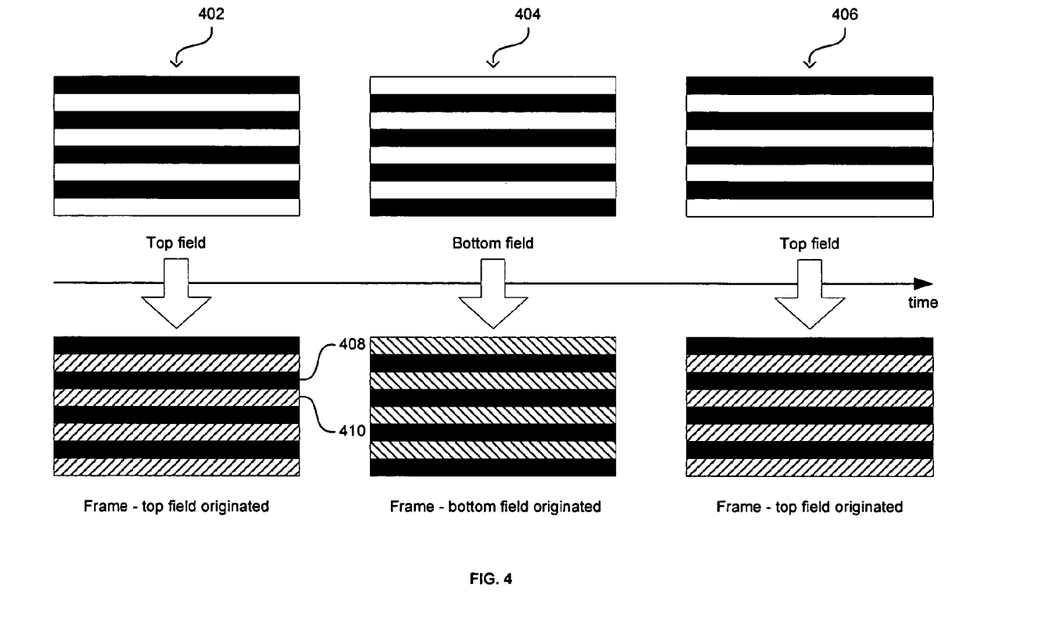
FIG. 4 illustrates an exemplary input and output of a deinterlacer, in accordance with an embodiment of the present invention.

FIG. 4 illustrates an exemplary input and output of a deinterlacer, in accordance with an embodiment of the present invention. Referring to FIG. 4, three fields are presented to the deinterlacer. The first field 402 is a top field, the second field 404 is a bottom field, and the third field 406 is a top field again. The first field 402 may be a bottom or top field, and the sequence of fields may alternate between top and bottom as appropriate depending on the first field 402. The deinterlacer may take the present lines in the field (black-colored lines in FIG. 4) and fill in the absent lines (clear lines in FIG. 4) to produce an output frame. The process of deinterlacing may be seen as taking one present line of pixels from the source field and producing two output lines of pixels. One line is the line that came from the source field and may be called the "present" line (black). An exemplary present line 408 is shown in FIG. 4 for the frame that originated from the first field 402. The other line is the line that needs to be created and may be called the "absent" line (hatched lines). An exemplary absent line 410 is shown in FIG. 4 for the frame that originated from the first field 402. This double output line pattern may then repeat to create the output frame. The pixels of the absent line may be computed using a deinterlacing procedure in accordance with an embodiment of the present invention. A line of present pixels may be output in parallel with a line of absent pixels. The two lines of output may make up the progressive frame lines.

Figure 5:
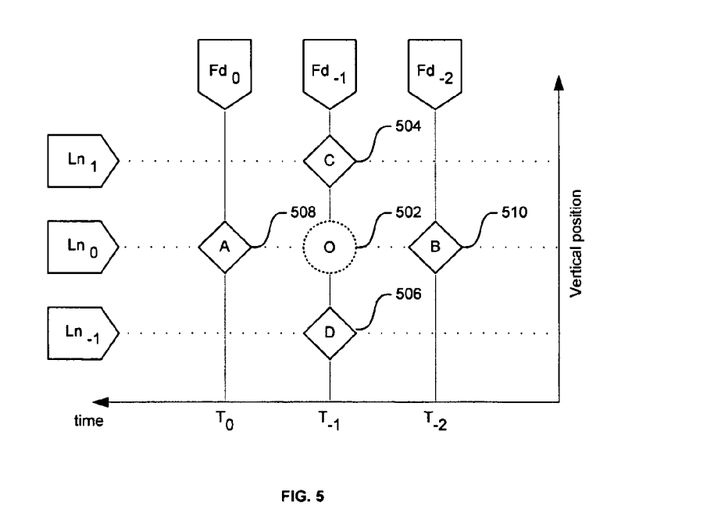
FIG. 5 illustrates an exemplary simple pixel constellation.

FIG. 5 illustrates an exemplary simple pixel constellation. Referring to FIG. 5, the current field under consideration is a field $Fd_{-1}$ at time $T_{-1}$ and the current absent line to be determined is a line $Ln_0$. The most recent field to occur is a field $Fd_0$ at time $T_0$ and the earliest field shown is a field $Fd_{-2}$ at time $T_{-2}$. Generally, except for the first and last output lines of a frame, there will always be a present line $Ln_1$ of known pixels above and another present line $Ln_{-1}$ of known pixels below the absent line $Ln_0$ to be determined. Looking forward and backwards in time to the fields $Fd_0$ and $Fd_{-2}$ adjacent to the current field $Fd_{-1}$, there will be present lines of known pixels at the same vertical position as the absent line $Ln_0$ currently being determined. Referring back to FIG. 5, each output pixel (O) 502 to be calculated in the absent line $Ln_0$, may be treated individually. Then, there will be one pixel above (C) 504 in present line $Ln_{-1}$ of current field $Fd_{-1}$, one pixel below (D) 506 in present line $Ln_1$ of current field $Fd_{-1}$, one pixel occurring forward in time (B) 508 in present line $Ln_0$ of field $Fd_0$, and one pixel occurring backwards in time (A) 510 in present line $Ln_0$ of current field $Fd_{-2}$.

Each output frame generated by deinterlacing may have a height H and a width W, and for equations hereinafter, t will represent the time index, i will represent the height index where $0 \leq i < H$, and j will represent the width index where $0 \leq j < W$. For an output frame originated by a top field such as, for example, top field 402 or 406 in FIG. 4, when i MOD 2=0, the pixels in a line are provided from a present line in a source field, and when i MOD 2=1 the line corresponds to an absent line and the pixels in that line must be determined. Conversely, in an output frame originated by a bottom field such as, for example, bottom field 404 in FIG. 4, when i MOD 2=1 the pixels in a line are provided from a present line in a source field, and when i MOD 2=0 the line corresponds to an absent line and the pixels in that line must be determined. Considering just luma (Y) for the bottom field originated example, the output pixel O 502 to be created is such that:

$$O = Y_O = Y(t, i, j) \text{ with } 0 \leq i < H, i \text{MOD} 2 = 0 \text{ and } 0 \leq j < W.$$

The other pixels of the constellation in FIG. 5, pixel A 508, pixel B 510, pixel C 504, and pixel D 506, which may be used to create the output pixel O 502, may then be referenced with respect to the location of output pixel O 502.

$$A = Y_A = Y(t-1, i, j);$$

$$B = Y_B = Y(t+1, i, j);$$

$$C = Y_C = Y(t, i-1, j);$$

$$D = Y_D = Y(t, i+1, j).$$

A motion adaptive deinterlacer creates an estimated value of output pixel O 502 by determining how much "motion" is present. Motion in this context refers to a pixel in a given spatial location changing over time. The motion may be due to, for example, objects moving or lighting conditions changing. It may be determined that there is little or no motion, then the best estimate for output pixel O 502 would be provided by pixel A 508 and pixel B 510, which is known as "weave" in graphics terminology. On the other hand, it may be determined that there is significant motion, then pixel A 508 and pixel B 510 no longer provide a good estimate for output pixel O 502. In this case, a better estimate would be provided by pixel C 504 and pixel D 506, which is known as "bob" in graphics terminology. This yields the following equations:

$$O = \frac{A+B}{2}$$

when motion is small (temporal average/weave);

$$O = \frac{C+D}{2}$$

when motion is large (spatial average/bob).

And motion may be determined by the following equation:

$$\text{motion} = \text{abs}(A - B).$$

If the values of pixel A 508 and B 510 are similar, the value determined for the motion would be small. If the values of pixel A 508 and B 510 are not very similar, the value determined for the motion would be large. The value determine for the motion may then be compared to a motion threshold to determine whether a temporal average or a spatial average approach is appropriate when determining the value of output pixel O 502.

In practice, the decision of using the threshold between the two approximations for output pixel O 502 may be visible in areas where one pixel may choose one method and an adjacent pixel may choose the other. Additionally, using only pixel A 508 and B 510 to determine motion may result in missing motion in certain situations such as, for example, when objects have texture and move at such a rate that the same intensity from the texture lines up with both pixel A 508 and B 510 repeatedly over time—the object may be moving, but as seen with the bunkered view of just examining the intensity at pixel A 508 and B 510, the motion may not be seen. This is known as "motion aliasing" and results in a weave or temporal averaging being performed when the situation may actually require a bob or spatial averaging. This method may produce visually unpleasant transition time on a sudden switch from motion to still in the video such as, for example, at a scene change.

Figure 6A:
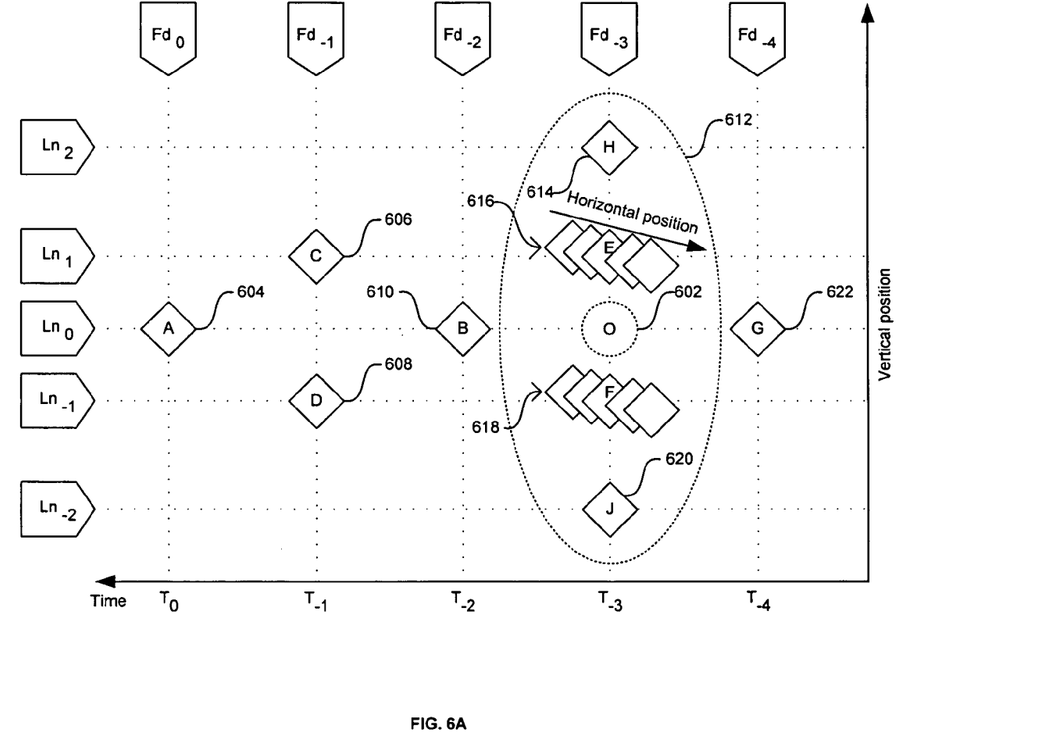
FIG. 6A illustrates an exemplary pixel constellation, in accordance with an embodiment of the present invention.

FIG. 6A illustrates an exemplary pixel constellation, in accordance with an embodiment of the present invention. Referring to FIG. 6A, the pixel constellation may comprise a plurality of pixels 612 in current field $Fd_{-3}$, a pixel (A) 604 in present line $Ln_0$ of field $Fd_0$, a pixel (C) 606 in present line $Ln_1$ of field $Fd_{-1}$, a pixel (D) 608 in present line $Ln_{-1}$ of field $Fd_{-1}$, a pixel (B) 610 in present line $Ln_0$ of field $Fd_{-2}$, and a pixel (G) 622 in present line $Ln_0$ of field $Fd_4$. The plurality of pixels 612 in current field $Fd_{-3}$ may comprise an output pixel (O) 602 in absent line $Ln_0$, a pixel (H) 614 in present line $Ln_2$, a plurality of pixels (E) 616 in present line $Ln_1$, a plurality of pixels (F) 618 in present line $Ln_{-1}$, and a pixel (J) 620 in present line $Ln_{-2}$.

Figure 6B:
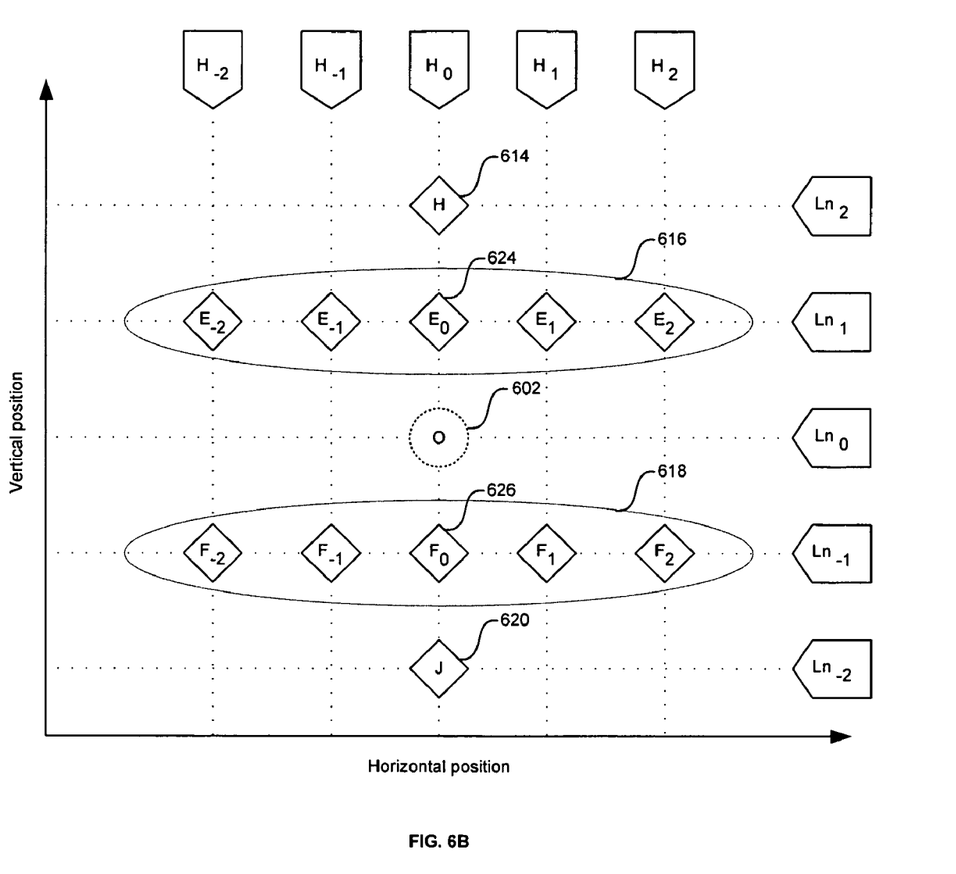
FIG. 6B illustrates exemplary positioning of constellation pixels in the current frame, in accordance with an embodiment of the invention.

FIG. 6B illustrates an exemplary positioning of constellation pixels in the current field, in accordance with an embodiment of the invention. Referring to FIG. 6B, the plurality of pixels E 616 in present line $Ln_1$ may comprise a pixel $E_0$ 624 immediately above the output pixel O 602, a pixel $E_{-1}$ and a pixel $E_{-2}$ to the left of the pixel $E_0$ 624, and a pixel $E_1$ and a pixel $E_2$ to the right of the pixel $E_0$ 624. Additional pixels to the right and left of pixel $E_0$ 624 may be used. Moreover, additional pixels may be used with pixel H 614 in present line $Ln_2$. The plurality of pixels F 618 in present line $Ln_{-1}$ may comprise a pixel $F_0$ 626 immediately below the output pixel O 602, a pixel $F_{-1}$ and a pixel $F_{-2}$ to the left of the pixel $F_0$ 626, and a pixel $F_1$ and a pixel $F_2$ to the right of the pixel $F_0$ 626. Additional pixels to the right and left of pixel $F_0$ 626 may be used. Moreover, additional pixels may be used with pixel J 620 in present line $Ln_{-2}$.

The pixel constellation shown in FIGS. 6A-6B may reduce the occurrence of motion aliasing by using information from additional fields. In an embodiment of the present invention, the constellation may also improve spatial averaging by including additional horizontal pixels, for example, the plurality of pixels E 616 and the plurality of pixels F 618 in present lines $L_1$ and $L_{-1}$ of current field $Fd_{-3}$, when determining the value of output pixel O 602. In an embodiment of the present invention, time $T_0$ is shown on the left; and fields to the right of $T_0$ are back in time from that reference point.

The following equations define a shorthand notation used hereinafter:

$$A = Y_A = Y(t,i,j);$$

$$B = Y_B = Y(t-2,i,j);$$

$$G = Y_G = Y(t-4,i,j);$$

$$C = Y_C = Y(t-1,i-1,j);$$

$$D = Y_D = Y(t-1, i+1,j);$$

$$E_k = Y_{E_k} = Y(t-3,i-1,j+k) \text{ for } -2 \leq k \leq 2;$$

$$H = Y_H = Y(t-3,i-3,j);$$

$$F_k = Y_{F_k} = Y(t-3,i+1,j+k) \text{ for } -2 \leq k \leq 2;$$

$$J = Y_J = Y(t-3,i+3,j).$$

For example, with reference to the pixel constellation given in FIGS. 6A-6B, pixel A 604 may represent the value of luma (Y) at given row or vertical position i, column or horizontal position j, and field time t. The row or vertical position i may also refer to the line in the field. The other pixels in the constellation may be positioned relative to pixel A 604. For example, pixel G 622 is located at the same row and column as pixel A 604 but in a field that occurred four fields prior to the field with pixel A 604.

In an embodiment of the present invention, the luma current motion, $m_a$, around the output pixel O 602 may be determined using pixels A 604 through G 622 according to the following equations, in which only $E_0$ and $F_0$ may be used from the plurality of pixels E 616 and the plurality of pixels F 618 since they have the same horizontal position as the other pixels in the constellation:

$$m_t = \text{MAX}(A,B,G) - \text{MIN}(A,B,G)$$

$$m_s = \text{MIN}(|E_0 - C|, |F_0 - D|)$$

$$m_a = \text{MAX}(m_t, m_s)$$

where $m_t$ is the luma current temporal motion and $m_s$ is the luma current spatial motion. The pattern of pixels used with the MAX and MIN functions may maximize the amount of motion which is detected to prevent motion aliasing and may provide a localized region of detection so that video containing mixed still and moving material may be displayed as stable, non-jittering pictures.

The luma current motion, $m_a$, for the output pixel O 602 may be stored so that it may be retrieved for use in determining a luma final motion, $m_f$, value for an output pixel in a field subsequent to the current field. The luma current motion, $m_a$, rather than the luma final motion, $m_f$, is used to prevent an infinite loop. The luma current motion, $m_a$, may be quantized before storage to reduce the memory requirements of the MAD-3:2 102 and/or the memory 106. When the luma current motion value lies on a quantization boundary, the lower quantization number may be selected so as to err on the side of still. The following is an exemplary 2-bit quantization for an 8-bit luma current motion:

$$Q_{out} = \begin{cases} 2'b00 & \text{when } 0 \leq m_a < 16 \\ 2'b01 & \text{when } 16 \leq m_a < 64 \\ 2'b10 & \text{when } 64 \leq m_a < 128 \\ 2'b11 & \text{when } 128 \leq m_a < 256 \end{cases}$$

where $Q_{out}$ corresponds to the quantized version of $m_a$.

Figure 7:
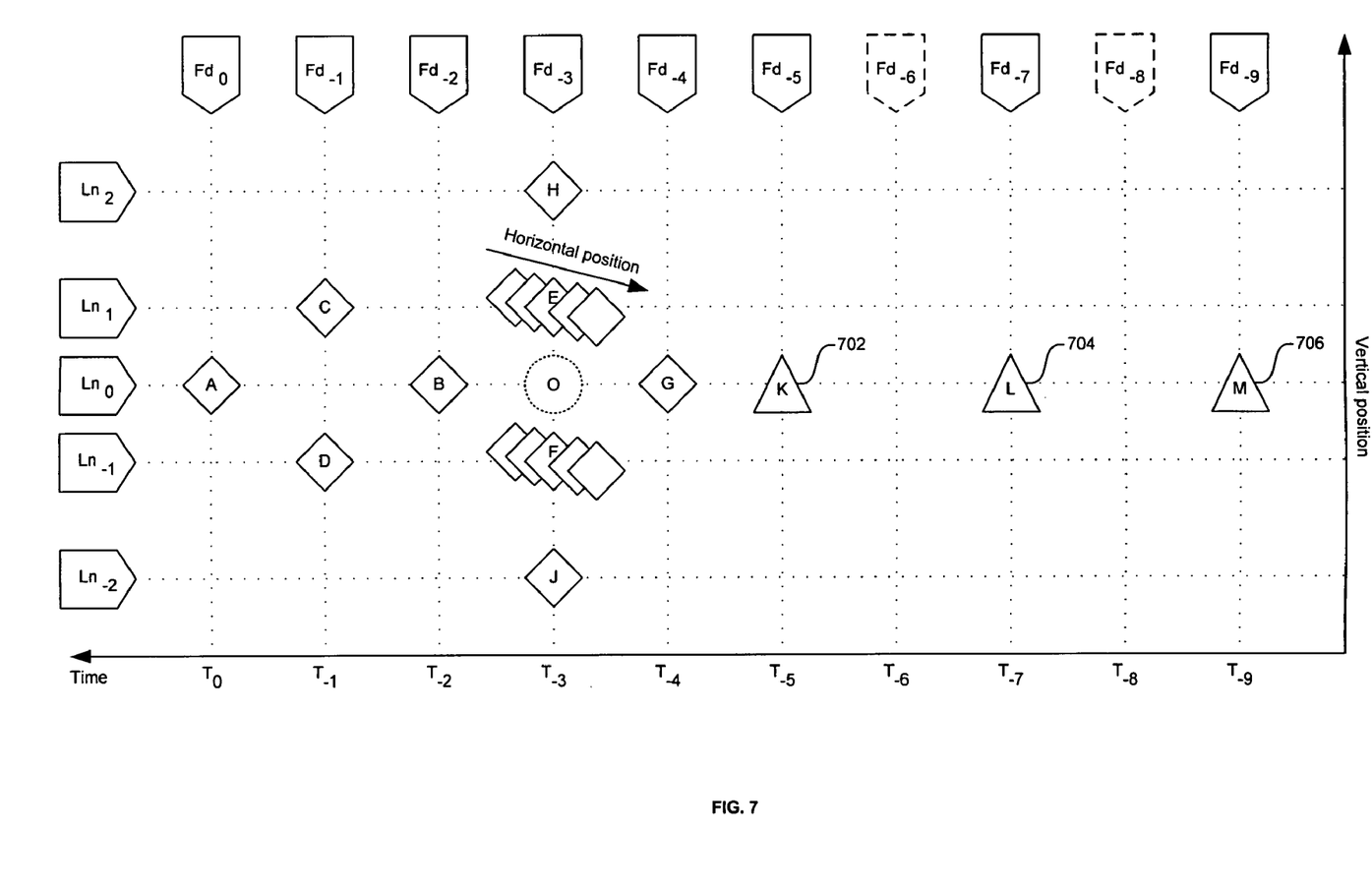
FIG. 7 illustrates an exemplary pixel constellation with locations for quantized historical motion values, in accordance with an embodiment of the present invention.

FIG. 7 illustrates an exemplary pixel constellation with locations for quantized historical motion values, in accordance with an embodiment of the present invention. Referring to FIG. 7, locations K 702, L 704, and M 706 are not actual pixels, but instead, they represent the spatial and temporal locations of historical luma current motions that may be used to determine the value of output pixel O 602. These historical luma current motions may have been quantized before storage. The gaps in historical luma current motion information at $Fd_{-6}$ and $Fd_{-8}$ are due to it being necessary to include historical current motion information from fields of the same type (top/bottom) as the current field. The coefficient Q may be used to correspond to a quantized version of the historical determination of current motion at that spatial/temporal location. The choice to use quantized motion allows for an increased range in time of fields, with minimal cost in gate or bandwidth. The benefit of quantization being improved image quality due to a reduced occurrence of motion aliasing.

The following equations may be used to define a shorthand notation used hereinafter to indicate the position of locations K 702, L 704, and M 706 relative to pixel A 604:

$$K = Q_K = Q(t-5,i,j);$$

$$L = Q_L = Q(t-7,i,j);$$

$$M = Q_M = Q(t-9,i,j);$$

where $Q_K$, $Q_L$, and $Q_M$ correspond to the quantized version of the historical luma current motions at locations K 702, L 704, and M 706 respectively.

The quantizied historical value for use in determining the value of the output pixel O 602 may be given by $Q_h = \text{MAX}<K, L, M>$, where if the values of K 702, L 704, and M 706 are, for example, 2-bit quantized numbers, then the value of $Q_h$ will also be a 2-bit quantized number. A conversion from the 2-bit quantized historical value for output pixel O 602, $Q_h$, to a, for example, 7-bit historical luma motion, $m_h$, may be as follows:

$$m_h = \begin{cases} 0 & \text{when } Q_h = 2'b00 \\ 16 & \text{when } Q_h = 2'b01 \\ 64 & \text{when } Q_h = 2'b10 \\ 128 & \text{when } Q_h = 2'b11 \end{cases}$$

The luma final motion, $m_f$, for output pixel O 602 may be determined from the luma current motion, $m_a$, and the historical luma motion, $m_h$, as follows:

$$m_f = \text{MAX}<m_a, m_h>.$$

The estimated luma value, $Y_O$, for output pixel O 602 may be determined as follows:

$$T_a(Y_O) = \frac{A+B}{2};$$

$$S_a(Y_O) = \frac{A+B}{2};$$

$$x = T_a(Y_O), y = S_a(Y_O), M = m_f;$$

$$Z = y - x;$$

$$M_L = \text{MAX}\{\text{MIN}(M, Z), -M\};$$

$$Y_O = x + M_L;$$

where $T_a(Y_O)$ is the temporal luma average, $S_a(Y_O)$ is the spatial luma average, x and y represent the two averages, $T_a(Y_O)$ and $S_a(Y_O)$, which may be used for output pixel O 602, Z is the range of values for output pixel O 602, M is the measure of motion which indicates where within the range Z the value of the output pixel O 602 will be, $M_L$ is the limited value of M so that it does not extend beyond the value of y, and $Y_O$ is the motion-adapted luma value of output pixel O 602.

When estimating a chroma value for output pixel O 602, the MAD-3:2 102 may use the pixel constellation shown in FIGS. 6A-7 to remove and/or mitigate the cross-chrominance effects that may result from comb filtering the video signal. Output pixel O 602 in FIG. 6A may comprise three signal components, $Y_O$, $Cr_O$, and $Cb_O$, where $Y_O$ may be determined as described above, and $Cr_O$ and $Cb_O$ are the chroma or color difference components which may be affected by the presence of cross-chrominance. Cross-chrominance may occur not only on pixels that are located in an absent line, for example, the output pixel O 602, but it may also occur on pixels that are located in a present line, for example, pixel $E_0$ 624 or pixel $F_0$ 626. Cross-chrominance removal may be different depending on whether the chroma value being estimated is for a pixel in an absent line or a pixel on a present line.

For the output pixel O 602, the spatial chroma average $S_a(Cr_O)$ and temporal chroma average $T_a(Cr_O)$ may be defined as follows:

$$S_a(Cr_O) = (Cr_E + Cr_F)/2;$$

$$T_a(Cr_O) = (Cr_B + Cr_G)/2;$$

where $Cr_E$, $Cr_F$, $Cr_B$, $Cr_G$, and $Cr_O$ correspond to the Cr chroma components for the pixel $E_0$ 624, the pixel $F_0$ 626, the pixel B 610, the pixel G 622, and the pixel O 602 respectively. When estimating the chroma for a pixel that is located in a present line, for example, the pixel $F_0$ 626, the spatial chroma average $S_a(Cr_F)$ and temporal chroma average $T_a(Cr_F)$ may be defined as follows:

$$S_a(Cr_F) = Cr_F;$$

$$T_a(Cr_F) = (Cr_F + Cr_D)/2;$$

where $Cr_D$ corresponds to the Cr chroma component for the pixel D 608. A similar approach may be used for the pixel $E_0$ 624, where any references to the pixel D 608 may be replaced with corresponding references to the pixel C 606.

In order to remove cross-chrominance, the MAD-3:2 102 may be used to determine which areas of the picture are static, also referred to as segmentation, and to remove the cross-chrominance from those areas, also referred to as enhancement. The task of segmentation may be very similar to the task of motion detection in certain respects. The MAD-3:2 102 may produce a luma current motion and a luma final motion for the output pixel under consideration, based on the pixel constellation as described above. In this regard, five total fields may be utilized, for example, for the detection of the luma motion.

For luma detection, a luma motion detector may be somewhat similar to the motion detector utilized for deinterlacing. However, the cross-chrominance removal may have to operate on both even and odd lines, even though the luma motion detector only produces motion values for a single field (i.e. every other line with respect to the output frame). To get the missing motion values for pixels in a present line, the algorithm may utilize the motion values calculated for the previous line. The motion values may also be derived from the next line. This approach has the advantage of being low cost and provides a relatively good quality output when used in conjunction with the rest of the algorithm.

In certain instances, the luma current motion, $m_a$, determined for the output pixel O 602 may be noisy after the image has been comb-filtered. In this regard, a programmable bias to the motion value $m_a$ may be allowed. Accordingly, a parameter chroma_ma is the chroma current motion and may be defined as:

$$\text{chroma\_ma} = \text{MAX}(0, m_a - \text{CHROMA\_MA\_OFFSET});$$

where CHROMA_MA_OFFSET is the chroma current motion offset parameter. The CHROMA_MA_OFFSET is a programmable parameter and its use is recommended for combed image sequences. The value of chroma_ma may be used in subsequent portions of the cross-chrominance removal.

In another embodiment of the invention, the chroma_ma may also be determined based on the cross-chrominance that may appear in a static picture. In that case, every other frame may contain similar chroma, and it may be possible to use the motion between pixel A 604 and pixel G 622 and account for it in the determination of the chroma_ma. For example, the chroma current motion may be modified by a motion modifier parameter (mod_chroma_motion) as follows:

$$\text{mod\_chroma\_motion} = \text{MAX}(ABS(Cr_A - Cr_G), ABS(Cb_A - Cb_G))$$

$$\text{chroma\_ma} = \text{MAX}(0, m_a - \text{CHROMA\_MA\_OFFSET}) + \text{mod\_chroma\_motion}.$$

At least a portion of the cross-chrominance removal may rely on the luma current motion for determining whether to use the temporal chroma average or the spatial chroma average. However, there may be cases where there is chroma motion in the video image, but the luma current motion is negligible or zero. This may occur in instances when colors represented on-screen have very similar Y but different Cr and/or Cb components. A mechanism such as a chroma motion detector (CMD) may be utilized for biasing the motion value toward field interpolation, that is, biasing towards spatially averaging the chroma. The CMD may operate on the assumption that there is typically not very much high-frequency vertical chroma detail. In many instances, this may not be a bad assumption because video is often stored in a 4:2:0 format. When the effect of cross-chrominance removal is to create a high-frequency edge, the operation of the chroma motion detector is to bias the motion towards field interpolation or spatial chroma averaging.

The chroma motion detector (CMD) may comprise an edge detection, a back-off, and motion biasing. The CMD may be implemented by using the MAD-3:2 102 and/or the processor 104. With reference to FIG. 6A, the edge detection may be utilized to determine a chroma edge magnitude, e, for the output pixel O 602. Since the presence of cross-chrominance may create artificial high-frequency content, the chroma may be filtered by using the temporal chroma average for a top pixel which is immediately above the output pixel O 602, the output pixel O 602, and a bottom pixel which is immediately below the output pixel O 602. In the case where a pixel is located in an absent line, the top pixel and the bottom pixel may be known or may be interpolated. For each component Cr and Cb, a chroma edge magnitude, e1 and e2 respectively, may be determined. The smaller of the chroma edge magnitudes of output-to-top pixel versus output-to-bottom pixel may be utilized. In the case where the output pixel is located on a present line, only the chroma in one direction may be known. Accordingly, the output-to-top pixel chroma edge magnitude for Cr and Cb may be utilized. The Cr and Cb chroma magnitude edges, e1 and e2, may be bound together with a MAX operation to produce the chroma edge magnitude, e, for the output pixel O 602.

Following the motion detection in the operation of CMD may be a back-off. It may have been assumed originally that there was not a significant level of high-frequency chroma detail. Since the edge detector may have limited or no knowledge about motion, a still image may potentially lose chroma detail. Accordingly, in an aspect of the invention, motion detection, for example, may be utilized to determine whether the chroma in the area of interest is static or moving. A static chroma, no_ccr_det, may be used to indicate the level of motion in an area of interest. The chroma edge magnitude, e, may be reduced if the chroma in the area of interest is static. The static chroma threshold parameter, NO_CCR_DETECT_THRESH, is a programmable parameter which may be utilized to specify how "still" the area needs to be before a back-off or reduction of the chroma edge magnitude is to be applied. If the static chroma, no_ccr_det, is greater than NO_CCR_DETECT_THRESH, then no back-off may be performed; otherwise, the chroma edge magnitude may be reduced by the back-off. The static blend parameter, NO_CCR_DETECT_BLEND, is a programmable value which may be utilized to specify how strongly the chroma edge magnitude will be backed off in the case of a still or near-still area of interest. Larger values for NO_CCR_DETECT_BLEND mean a harder switch to disable the edge detector. The back-off may be determined based on no_ccr_det, NO_CCR_DETECT_THRESH, and NO_CCR_DETECT_BLEND and may be applied to the chroma edge magnitude, e.

The motion biasing in the chroma motion detector (CMD) may be utilized to apply a backed-off chroma edge magnitude to the chroma current motion, chroma_ma. This may have the effect of adding or doing nothing to the chroma_ma, depending on whether the area of interest is static or not, and it may not involve subtracting. The motion bias threshold parameter, SIMILAR_THRESH, is a programmable parameter which may specify the amount of chroma edge magnitude that is allowable before a bias is applied to chroma_ma. The motion blend parameter, SIMILAR_BLEND, is a programmable parameter which may be utilized to specify how strongly a chroma edge magnitude exceeding SIMILAR_THRESH will bias the chroma_ma value toward field interpolation. The SIMILAR_THRESH parameter may specifies the intensity of chroma vertical edge required before the start of back off from cross-chrominance reduction. Finally, since chroma_ma may be implemented as, for example, an 8-bit number, values larger than 255 may be saturated to 255. In a case where chroma_ma may be implemented as, for example, a 16-bit number, values larger than 65535 may be saturated to 65535.

Although some conventional systems may be utilized to detect chroma edges and motion, these have a tendency to ignore cross-chrominance. Accordingly, various aspects of the invention for cross-chrominance removal using motion detection may be applied to these conventional system.

The following steps illustrate a mathematical treatment of the chroma edge detector, which may be utilized in connection with cross-chrominance removal using motion detection in accordance with various embodiments of the invention. For calculating chroma motion for the output pixel O 602 located in an absent line:

top_Cr=($Cr_C$+$Cr_E$)/2;
top_Cb=($Cb_C$+$Cb_E$)/2;
bottom_Cr=($Cr_D$+$Cr_F$)/2;
bottom_Cb=($Cb_D$+$Cb_F$)/2;
no_ccr_det=MAX(ABS($Cr_B$–$Cr_G$), ABS($Cb_B$–$Cb_G$));
if   no_ccr_det<NO_CCR_DETECT_THRESH   then
    back_off=CLAMP((NO_CCR_DETECT_THRESH–no_ccr_det)*
    NO_CCR_DETECT_BLEND, 0, 255)
else
    back_off=0;
e1=MIN(ABS($T_a$($Cr_J$)–top_Cr),   ABS($T_a$($Cr_O$)–bottom_Cr));
e2=MIN(ABS($T_a$($Cb_O$)–top_Cb),   ABS($T_a$($Cb_O$)–bottom_Cb));
e=MAX(e1, e2)–back_off;
if e>SIMILAR_THRESH then
    chroma_ma=chroma_ma+(e   –SIMILAR_THRESH)
    *SIMILAR_BLEND
else
    chroma_ma=chroma_ma;

where $Cr_C$, $Cr_E$, $Cr_D$, $Cr_F$, $Cr_B$, $Cr_G$, and $Cr_O$ correspond to the Cr chroma components for the pixel C 606, the pixel $E_O$ 624, the pixel D 608, the pixel $F_O$ 626, the pixel B 610, the pixel G 622, and the pixel O 602 respectively. The Cb chroma components $Cb_C$, $Cb_E$, $Cb_D$, $Cb_F$, $Cb_B$, $Cb_G$, and $Cb_O$ correspond to the pixel C 606, the pixel $E_O$ 624, the pixel D 608, the pixel $F_O$ 626, the pixel B 610, the pixel G 622, and the pixel O 602 respectively. The modified chroma_ma may be used in the enhancement step of cross-chrominance removal.

For determining the chroma current motion when a pixel is located on a present line, for example, the pixel $F_0$ 626, the following steps may be used:

top_Cr=($Cr_B$+$Cr_G$)/2;
top_Cb=($Cb_B$+$Cb_G$)/2;
no_ccr_det=MAX(ABS($Cr_D$–$Cr_F$), ABS($Cb_D$–$Cb_F$));
if   no_ccr_det<NO_CCR_DETECT_THRESH   then
    back_off=CLAMP((NO_CCR_DETECT_THRESH–no_ccr_det)*
    NO_CCR_DETECT_BLEND, 0, 255)
else
    back_off=0;
e1=ABS($T_a$($Cr_F$)–top_Cr);
e2=ABS($T_a$(CbF)–top_Cb);
e=MAX(e1, e2)–back_off;
if e>SIMILAR_THRESH then
    chroma_ma=chroma_ma+(e   —SIMILAR_THRESH)
    *SIMILAR_BLEND else
chroma_ma=chroma_ma;

where $Cr_E$, $Cr_F$, $Cr_B$, and $Cr_G$ correspond to the Cr chroma components for the pixel $E_0$ 624, the pixel $F_0$ 626, the pixel B 610, and the pixel G 622 respectively. The Cb chroma components $Cb_E$, $Cb_F$, $Cb_B$, and $Cb_G$ correspond to the pixel $E_0$ 624, the pixel $F_0$ 626, the pixel B 610, and the pixel G 622 respectively. Since looking at both top and bottom edges would require an extra line buffer in the pixel $F_O$ 626 case, only the top edge may be used for this portion of the cross-chrominance removal. The bottom edge may also be used in instances where it may make implementation of the algorithm easier. The modified chroma_ma may be used for enhancement during of cross-chrominance removal.

In another embodiment of the invention, additional pixels from the pixel constellation may be used in determining the chroma current motion for a pixel located in either an absent line or in a present line. For example, the following steps may also be used for calculating chroma motion for the output pixel O 602 located in an absent line:

max_Cr=MAX(MAX($Cr_A$, $Cr_B$), $Cr_G$);
max_Cb=MAX(MAX($Cb_A$, $Cb_B$), $Cb_G$);
min_Cr=MIN(MIN($Cr_A$, $Cr_B$), $Cr_G$);
min_Cb=MIN(MIN($Cb_A$, $Cb_B$), $Cb_G$);
no_ccr_det=MAX(max_Cr−min_Cr, max_Cb−min_Cb);
no_ccr_det=MAX(no_ccr_det, ABS($Cr_C$−$Cr_E$));
no_ccr_det=MAX(no_ccr_det, ABS($Cb_C$−$Cb_E$));
no_ccr_det=MAX(no_ccr_det, ABS($Cr_D$−$Cr_F$));
no_ccr_det=MAX(no_ccr_det, ABS($Cb_D$−$Cb_F$));
top_Cr=($Cr_C$+$Cr_E$)/2;
top_Cb=($Cb_C$+$Cb_E$)/2;
bottom_Cr=($Cr_D$+$Cr_F$)/2;
bottom_Cb=($Cb_D$+$Cb_F$)/2;
e1=MIN(ABS($T_a$($Cr_O$)−top_Cr), ABS($T_a$($Cr_O$)−bottom_Cr));
e2=MIN(ABS($T_a$($Cb_O$)−top_Cb), ABS($T_a$($Cb_O$)−bottom_Cb));
e=MAX(e1, e2);
no_ccr_det_sat=MAX(0, MIN(no_ccr_det, NO_CCR_DETECT_MAX)−NO_CCR_DETECT_THRESH);
e_sat=MAX(0, MIN(e, SIMILAR MAX)−SIMILAR_THRESH);
chroma_ma=chroma_ma+((e_sat*no_ccr_det_sat)<<4))>>NO_CCR_DETECT_BLEND;

where $Cr_A$ and $Cr_B$ correspond to the Cr chroma components for the pixel A 604 and the pixel B 610 respectively. The Cb chroma components $Cb_A$ and $Cb_B$ correspond to the A 604 and the pixel B 610 respectively. The parameters NO_CCR_DETECT_THRESH, NO_CCR_DETECT_BLEND, NO_CCR_DETECT_MAX, SIMILAR_THRESH, and SIMILAR_MAX may be programmable constants. The modified chroma_ma may be used in the enhancement step of cross-chrominance removal.

For determining the chroma current motion when a pixel is located on a present line, for example, the pixel $F_O$ 626, the following steps may be used:

max_Cr=MAX(MAX($Cr_A$, $Cr_B$), $Cr_G$);
max_Cb=MAX(MAX($Cb_A$, $Cb_B$), $Cb_G$);
min_Cr=MIN(MIN($Cr_A$, $Cr_B$), $Cr_G$);
min_Cb=MIN(MIN($Cb_A$, $Cb_B$), $Cb_G$);
no_ccr_det=MAX(max_Cr−min_Cr, max_Cb−min_Cb);
no_ccr_det=MAX(no_ccr_det, ABS($Cr_D$−$Cr_F$));
no_ccr_det=MAX(no_ccr_det, ABS($Cb_D$−$Cb_F$));
no_ccr_det=MAX(ABS($Cr_B$−$Cr_G$), ABS($Cb_B$−$Cb_G$));
top_Cr=($Cr_B$+$Cr_G$)/2;
top_Cb=($Cb_B$+$Cb_G$)/2;
e1=ABS($T_a$($Cr_F$)−top_Cr);
e2=ABS($T_a$($Cb_F$)−top_Cb);
e=MAX(e1, e2);
no_ccr_det_sat=MAX(0, MIN(no_ccr_det, NO_CCR_DETECT_MAX)−NO_CCR_DETECT_THRESH);
e_sat=MAX(0, MIN(e, SIMILAR MAX)−SIMILAR_THRESH);
chroma_ma=chroma_ma+((e_sat*no_ccr_det_sat)<<4))>>NO_CCR_DETECT_BLEND;

where the parameters NO_CCR_DETECT_THRESH, NO_CCR_DETECT_BLEND, NO_CCR_DETECT_MAX, SIMILAR_THRESH, and SIMILAR_MAX may be programmable constants. The modified chroma_ma may be used in the enhancement step of cross-chrominance removal.

Figure 8A:
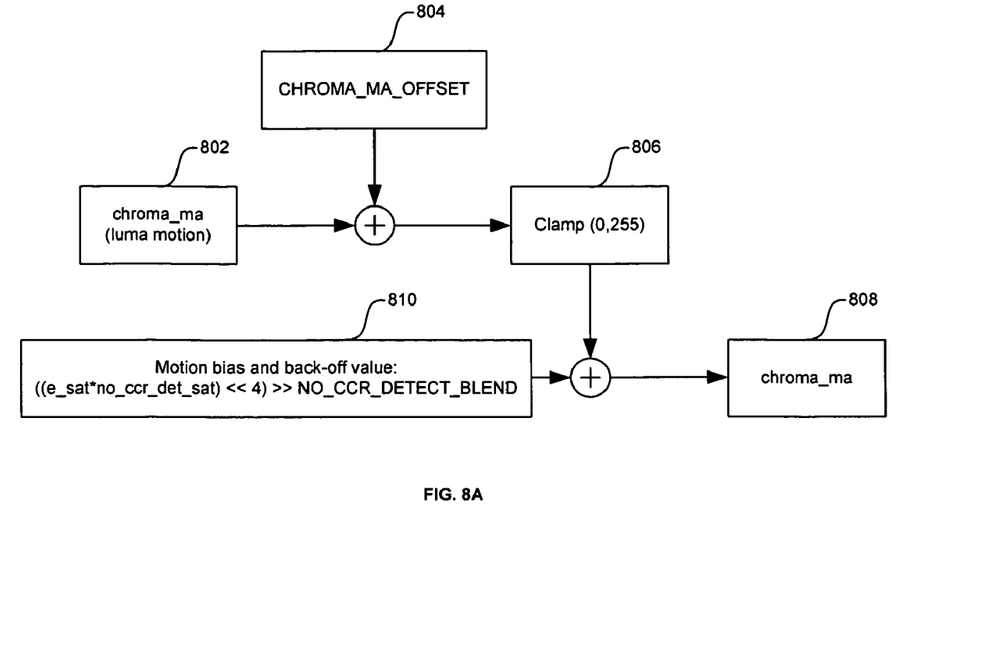
FIG. 8A illustrates an exemplary current chroma motion calculation, in accordance with an embodiment of the present invention.

FIG. 8A illustrates an exemplary current chroma motion calculation, in accordance with an embodiment of the present invention. Referring to FIG. 8A, a chroma_ma 802 determined from luma motion may be added to a CHROMA_MA_OFFSET 804. The CHROMA_MA_OFFSET 804 may be programmable and may be modified dynamically during operation. The addition of the chroma_ma 802 and the CHROMA_MA_OFFSET 804 may be clamped by a clamp 806. The clamp 806 may be implemented as a 0-255 clamp. The output of the clamp 806 may be added to the result of the motion bias and back-off value 810 to produce the current chroma motion for use in the enhancement step.

Figure 8B:
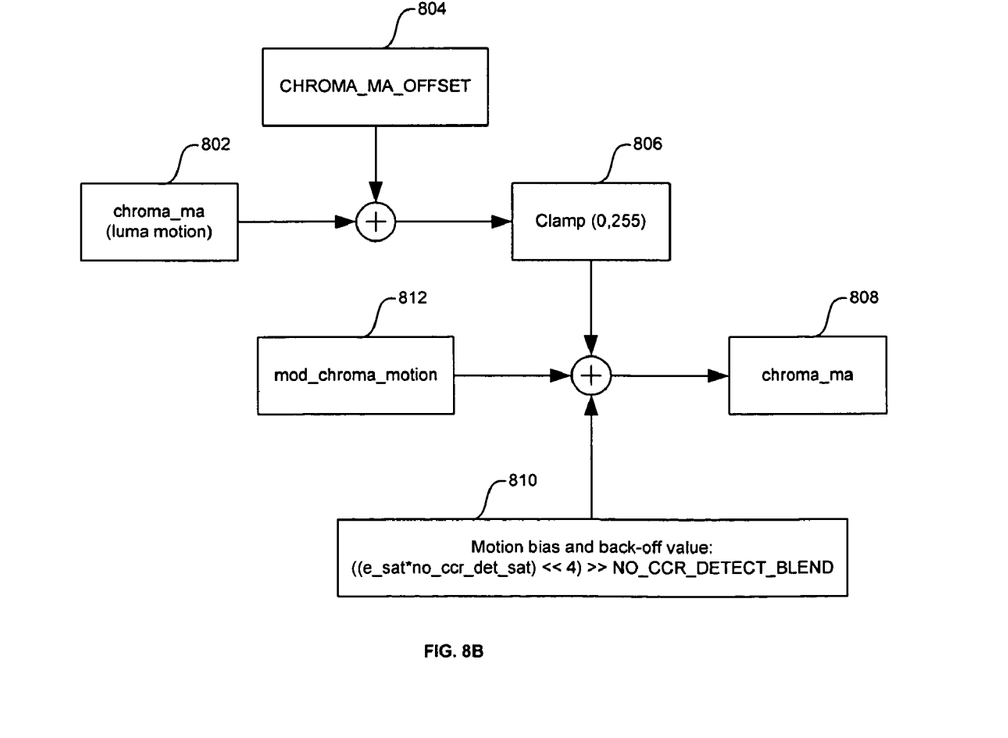
FIG. 8B illustrates an exemplary current chroma motion calculation with chroma motion modifier, in accordance with an embodiment of the present invention.

FIG. 8B illustrates an exemplary current chroma motion calculation with chroma motion modifier, in accordance with an embodiment of the present invention. Referring to FIG. 8B, the chroma_ma 802 determined from luma motion may be added to the CHROMA_MA_OFFSET 804. The CHROMA_MA_OFFSET 804 may be programmable and may be modified dynamically during operation. The addition of the chroma_ma 802 and the CHROMA_MA_OFFSET 804 may be clamped by the clamp 806. The clamp 806 may be implemented as a 0-255 clamp. The output of the clamp 806 may be added to a motion bias and back-off value 810 and to a mod_chroma_motion 812 to produce the current chroma motion for use in the enhancement step.

The enhancement may comprise determining how to utilize the calculated current chroma motion, chroma_ma, to remove the cross-chrominance. The procedure used for this may be somewhat similar to the blending procedure that is utilized by the MAD-3:2 102. The blending approach is the same for a pixel located in an absent line as for a pixel located in a present line, and may be given by the following equations:

$$mc\_Cr = \text{CLAMP}((S_a(Cr_O) - T_a(Cr_O)), -\text{chroma\_ma}, \text{chroma\_ma});$$

$$mc\_Cb = \text{CLAMP}((S_a(Cb_O) - T_a(Cb_O)), -\text{chroma\_ma}, \text{chroma\_ma});$$

$$Cr_e = T_a(Cr_O) + mc\_Cr;$$

$$Cb_e = Ta(Cb_O) + mc\_Cb;$$

where mc_Cr and mc_Cb are the Cr and Cb cross-chrominance, and $Cr_e$ and $Cb_e$ are the enhanced Cr and enhanced Cb after cross-chrominance removal.

Since the luma motion detector may sometimes miss chroma motion, various mechanisms may be utilized to bias the motion value more towards field interpolation in order to compensate for the missed chroma motion. One mechanism may involve the use of a chroma blend limiter to prevent the final chroma value from deviating more than a specified amount from the field-interpolated value. This may be particularly useful because it may mitigate the effect of the cross-chrominance removal all the way to the point of disabling it. Furthermore, since in most instances the cross-chrominance vector is small in magnitude, a reasonable value will not dramatically decrease the effectiveness of the removal algorithm. The mechanism utilized by the chroma blend limiter may be applied to the $Cr_e$ and $Cb_e$ values to get the final chroma output for the output pixel. A chroma low-pass filter may be utilized to mitigate chroma artifacts caused by interlaced sub-sampling. For example, the chroma low-pass filter may be utilized to reduce 4:2:0 subsampling artifacts.

The following equation may be used to define the output Cr chroma component:

$$\text{output\_}Cr = \{Cr_e \text{ when } S_a(Cr_O) - \text{MAX\_XCHROMA} <= Cr_e <= S_a(Cr_O) + \text{MAX\_XCHROMA} \{S_a(Cr_O) - \text{MAX\_XCHROMA} \text{ when } Cr_e < S_a(Cr_O) - \text{MAX\_XCHROMA} \{S_a(Cr_O) + \text{MAX\_XCHROMA} \text{ when } Cr_e > S_a(Cr_O) + \text{MAX\_XCHROMA};$$

where the maximum cross-chroma parameter, MAX_XCHROMA, is a programmable parameter that indicates the maximum amount to let the resulting chroma deviate from the spatial chroma average. The output Cr chroma, output_Cr, is the final output value for $Cr_O$ and $Cr_e$ is the chrominance value as estimated by the blending calculation in the enhancement step. This may have the effect of limiting $Cr_e$ output to a windowed range (+/−MAX_XCHROMA) around the spatial chroma average for the output pixel, $S_a(Cr_O)$.

Similarly, the following equation may be used to define the output Cb chroma component:

$$\text{output\_}Cb = \{Cb_e \text{ when } S_a(Cb_O) - \text{MAX\_XCHROMA} <= Cb_e <= S_a(Cb_O) + \text{MAX\_XCHROMA} \{S_a(Cb_O) - \text{MAX\_XCHROMA} \text{ when } Cb_e < S_a(Cb_O) - \text{MAX\_XCHROMA} \{S_a(Cb_O) + \text{MAX\_XCHROMA} \text{ when } Cb_e > S_a(Cb_O) + \text{MAX\_XCHROMA};$$

where the maximum cross-chroma parameter, MAX_XCHROMA, is a programmable parameter that indicates the maximum amount to let the resulting chroma deviate from the spatial chroma average. The output Cb chroma, output_Cb, is the final output value for $Cb_O$ and $Cb_e$ is the chrominance value as estimated by the blending calculation in the enhancement step. This may have the effect of limiting $Cb_e$ output to a windowed range (+/−MAX_XCHROMA) around the spatial chroma average for the output pixel, $S_a(Cb_O)$.

In one aspect of the invention, cross-chrominance removal using motion detection may utilize the storage of, for example, 3 chroma fields. Accordingly, in instances where memory space is a premium, 3-D combing is utilized, and/or where a digital-only device is required, then cross-chrominance removal may be skipped. Cross-chrominance removal may be enabled when 2-D combing is utilized. Although not required, the cross-chrominance removal may be utilized for 3-D combed images and MPEG sources since it may improve chroma resolution and remove cross-chrominance from source material.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video signal processing, the method comprising:
   comb filtering a video signal;
   defining an output pixel in said comb filtered video signal;
   removing a cross-chrominance from said output pixel downstream from said comb filtering; and
   limiting said removed cross-chrominance comb filtered video signal based on a spatial chroma average and a maximum cross-chroma parameter.

2. A method for video signal processing, the method comprising:
   comb filtering a video signal;
   defining an output pixel in said comb filtered video signal;
   removing a cross-chrominance from said output pixel downstream from said comb filtering; and
   modifying a chroma current motion by a motion modifier parameter and utilizing said modified current chroma motion to determine said cross-chrominance.

3. A method for video signal processing, the method comprising:
   comb filtering a video signal;
   defining an output pixel in said comb filtered video signal;
   removing a cross-chrominance from said output pixel downstream from said comb filtering; and
   determining a chroma current motion for said output pixel based on a luma current motion and a chroma current motion offset parameter, when said output pixel is in an absent line.

4. A method for video signal processing, the method comprising:
   comb filtering a video signal;
   defining an output pixel in said comb filtered video signal;
   removing a cross-chrominance from said output pixel downstream from said comb filtering; and
   assigning a chroma current motion for a pixel immediately above or below said output pixel to a chroma current motion for said output pixel, when said output pixel is in a present line.

5. A method for video signal processing, the method comprising:
   comb filtering a video signal;
   defining an output pixel in said comb filtered video signal;
   removing a cross-chrominance from said output pixel downstream from said comb filtering; and
   filtering a temporal chroma average for a pixel immediately above said output pixel, a temporal chroma average for said output pixel, and a temporal chroma average for a pixel immediately below said output pixel, when said output pixel is in an absent line.

6. A method for video signal processing, the method comprising:
- comb filtering a video signal;
- defining an output pixel in said comb filtered video signal;
- removing a cross-chrominance from said output pixel downstream from said comb filtering; and
- filtering a temporal chroma average for said output pixel and a temporal chroma average for a pixel immediately above or immediately below said output pixel, when said output pixel is in a present line.

7. A method for video signal processing, the method comprising:
- comb filtering a video signal;
- defining an output pixel in said comb filtered video signal;
- removing a cross-chrominance from said output pixel downstream from said comb filtering; and
- comparing a static chroma to a static chroma threshold parameter to determine if said output pixel is in a static chroma area and to determine a back-off for said output pixel.

8. A method for video signal processing, the method comprising:
- comb filtering a video signal;
- defining an output pixel in said comb filtered video signal;
- removing a cross-chrominance from said output pixel downstream from said comb filtering; and
- determining a chroma edge magnitude for said output pixel.

9. A method for video signal processing, the method comprising:
- comb filtering a video signal;
- defining an output pixel in said comb filtered video signal;
- removing a cross-chrominance from said output pixel downstream from said comb filtering; and
- reducing a chroma edge magnitude for said output pixel by a back-off.

10. A method for video signal processing, the method comprising:
- comb filtering a video signal;
- defining an output pixel in said comb filtered video signal;
- removing a cross-chrominance from said output pixel downstream from said comb filtering; and
- modifying a chroma current motion for said output pixel based on a comparison of a chroma edge magnitude and a motion bias threshold parameter.

11. A machine-readable storage having stored thereon, a computer program having at least one code section for video signal processing, the at least one code section being executable by a machine for causing the machine to perform steps comprising:
- comb filtering a video signal;
- defining an output pixel in said comb filtered video signal;
- removing a cross-chrominance from said output pixel downstream from said comb filtering; and
- wherein said at least one code section comprises code for limiting said removed cross-chrominance comb filtered video signal based on a spatial chroma average and a maximum cross-chroma parameter.

12. A machine-readable storage having stored thereon, a computer program having at least one code section for video signal processing, the at least one code section being executable by a machine for causing the machine to perform steps comprising:
- comb filtering a video signal;
- defining an output pixel in said comb filtered video signal;
- removing a cross-chrominance from said output pixel downstream from said comb filtering; and
- wherein said at least one code section comprises code for modifying a chroma current motion by a motion modifier parameter and utilizing said modified current chroma motion to determine said cross-chrominance.

13. A machine-readable storage having stored thereon, a computer program having at least one code section for video signal processing, the at least one code section being executable by a machine for causing the machine to perform steps comprising:
- comb filtering a video signal;
- defining an output pixel in said comb filtered video signal;
- removing a cross-chrominance from said output pixel downstream from said comb filtering; and
- wherein said at least one code section further comprises code for determining a chroma current motion for said output pixel based on a luma current motion and a chroma current motion offset parameter, when said output pixel is in an absent line.

14. The machine-readable storage having stored thereon, a computer program having at least one code section for video signal processing, the at least one code section being executable by a machine for causing the machine to perform steps comprising:
- comb filtering a video signal;
- defining an output pixel in said comb filtered video signal;
- removing a cross-chrominance from said output pixel downstream from said comb filtering; and
- wherein said at least one code section further comprises code for assigning a chroma current motion for a pixel immediately above or below said output pixel to a chroma current motion for said output pixel, when said output pixel is in a present line.

15. A machine-readable storage having stored thereon, a computer program having at least one code section for video signal processing, the at least one code section being executable by a machine for causing the machine to perform steps comprising:
- comb filtering a video signal;
- defining an output pixel in said comb filtered video signal;
- removing a cross-chrominance from said output pixel downstream from said comb filtering; and
- wherein said at least one code section further comprises code for filtering a temporal chroma average for a pixel immediately above said output pixel, a temporal chroma average for said output pixel, and a temporal chroma average for a pixel immediately below said output pixel, when said output pixel is in an absent line.

16. A machine-readable storage having stored thereon, a computer program having at least one code section for video signal processing, the at least one code section being executable by a machine for causing the machine to perform steps comprising:
- comb filtering a video signal;
- defining an output pixel in said comb filtered video signal;
- removing a cross-chrominance from said output pixel downstream from said comb filtering; and
- wherein said at least one code section further comprises code for filtering a temporal chroma average for said output pixel and a temporal chroma average for a pixel immediately above or immediately below said output pixel, when said output pixel is in a present line.

17. A machine-readable storage having stored thereon, a computer program having at least one code section for video signal processing, the at least one code section being executable by a machine for causing the machine to perform steps comprising:

comb filtering a video signal;
defining an output pixel in said comb filtered video signal;
removing a cross-chrominance from said output pixel downstream from said comb filtering; and
wherein said at least one code section further comprises code for comparing a static chroma to a static chroma threshold parameter to determine if said output pixel is in a static chroma area and to determine a back-off for said output pixel.

18. A machine-readable storage having stored thereon, a computer program having at least one code section for video signal processing, the at least one code section being executable by a machine for causing the machine to perform steps comprising:
comb filtering a video signal;
defining an output pixel in said comb filtered video signal;
removing a cross-chrominance from said output pixel downstream from said comb filtering; and
wherein said at least one code section further comprises code for determining a chroma edge magnitude for said output pixel.

19. A machine-readable storage having stored thereon, a computer program having at least one code section for video signal processing, the at least one code section being executable by a machine for causing the machine to perform steps comprising:
comb filtering a video signal;
defining an output pixel in said comb filtered video signal;
removing a cross-chrominance from said output pixel downstream from said comb filtering; and
wherein said at least one code section further comprises code for reducing a chroma edge magnitude for said output pixel by a back-off.

20. A machine-readable storage having stored thereon, a computer program having at least one code section for video signal processing, the at least one code section being executable by a machine for causing the machine to perform steps comprising:
comb filtering a video signal;
defining an output pixel in said comb filtered video signal;
removing a cross-chrominance from said output pixel downstream from said comb filtering; and
wherein said at least one code section further comprises code for modifying a chroma current motion for said output pixel based on a comparison of a chroma edge magnitude and a motion bias threshold parameter.

21. A system for video signal processing, the system comprising:
a comb filter that comb filters a video signal;
at least one processor that defines an output pixel in said comb filtered video signal;
said at least one processor removes a cross-chrominance from said output pixel downstream from said comb filtering; and
said at least one processor limits said removed cross-chrominance comb filtered video signal based on a spatial chroma average and a maximum cross-chroma parameter.

22. A system for video signal processing, the system comprising:
a comb filter that comb filters a video signal;
at least one processor that defines an output pixel in said comb filtered video signal;
said at least one processor removes a cross-chrominance from said output pixel downstream from said comb filtering; and
said at least one processor modifies a chroma current motion by a motion modifier parameter and utilizes said modified current chroma motion to determine said cross-chrominance.

23. A system for video signal processing, the system comprising:
a comb filter that comb filters a video signal;
at least one processor that defines an output pixel in said comb filtered video signal;
said at least one processor removes a cross-chrominance from said output pixel downstream from said comb filtering; and
said at least one processor determines a chroma current motion for said output pixel based on a luma current motion and a chroma current motion offset parameter, when said output pixel is in an absent line.

24. A system for video signal processing, the system comprising:
a comb filter that comb filters a video signal;
at least one processor that defines an output pixel in said comb filtered video signal;
said at least one processor removes a cross-chrominance from said output pixel downstream from said comb filtering; and
said at least one processor assigns a chroma current motion for a pixel immediately above or below said output pixel to a chroma current motion for said output pixel, when said output pixel is in a present line.

25. A system for video signal processing, the system comprising:
a comb filter that comb filters a video signal;
at least one processor that defines an output pixel in said comb filtered video signal;
said at least one processor removes a cross-chrominance from said output pixel downstream from said comb filtering; and
said at least one processor filters a temporal chroma average for a pixel immediately above said output pixel, a temporal chroma average for said output pixel, and a temporal chroma average for a pixel immediately below said output pixel, when said output pixel is in an absent line.

26. A system for video signal processing, the system comprising:
a comb filter that comb filters a video signal;
at least one processor that defines an output pixel in said comb filtered video signal;
said at least one processor removes a cross-chrominance from said output pixel downstream from said comb filtering; and
said at least one processor filters a temporal chroma average for said output pixel and a temporal chroma average for a pixel immediately above or immediately below said output pixel, when said output pixel is in a present line.

27. A system for video signal processing, the system comprising:
a comb filter that comb filters a video signal;
at least one processor that defines an output pixel in said comb filtered video signal;
said at least one processor removes a cross-chrominance from said output pixel downstream from said comb filtering; and
said at least one processor compares a static chroma to a static chroma threshold parameter to determine if said output pixel is in a static chroma area and to determine a back-off for said output pixel.

28. A system for video signal processing, the system comprising:
- a comb filter that comb filters a video signal;
- at least one processor that defines an output pixel in said comb filtered video signal;
- said at least one processor removes a cross-chrominance from said output pixel downstream from said comb filtering; and
- said at least one processor determines a chroma edge magnitude for said output pixel.

29. A system for video signal processing, the system comprising:
- a comb filter that comb filters a video signal;
- at least one processor that defines an output pixel in said comb filtered video signal;
- said at least one processor removes a cross-chrominance from said output pixel downstream from said comb filtering; and
- said at least one processor reduces a chroma edge magnitude for said output pixel by a back-off.

30. A system for video signal processing, the system comprising:
- a comb filter that comb filters a video signal;
- at least one processor that defines an output pixel in said comb filtered video signal;
- said at least one processor removes a cross-chrominance from said output pixel downstream from said comb filtering; and
- said at least one processor modifies a chroma current motion for said output pixel based on a comparison of a chroma edge magnitude and a motion bias threshold parameter.

* * * * *